US012643306B2

(12) United States Patent
    Ennis

(10) Patent No.: US 12,643,306 B2
(45) Date of Patent: Jun. 2, 2026

(54) ROOFING UNDERLAYMENT

(71) Applicant: International Insulation Products, LLC, Orlando, FL (US)

(72) Inventor: Dermot Joseph Ennis, Spring Grove, PA (US)

(73) Assignee: International Insulation Products, LLC, Orlando, FL (US)

( * ) Notice: Subject to any disclaimer, the term of this patent is extended or adjusted under 35 U.S.C. 154(b) by 0 days.

(21) Appl. No.: 18/381,460

(22) Filed: Oct. 18, 2023

(65) Prior Publication Data

US 2024/0051255 A1    Feb. 15, 2024

Related U.S. Application Data

(62) Division of application No. 15/316,624, filed as application No. PCT/US2015/034442 on Jun. 5, 2015.

(60) Provisional application No. 62/010,059, filed on Jun. 10, 2014.

(51) Int. Cl.
    *B32B 5/02*      (2006.01)
    *B32B 5/18*      (2006.01)
    *B32B 7/12*      (2006.01)
    *B32B 15/04*     (2006.01)
    *B32B 15/14*     (2006.01)
    *B32B 15/20*     (2006.01)
    *B32B 27/36*     (2006.01)
    *B32B 37/12*     (2006.01)
    *E04D 12/00*     (2006.01)

(52) U.S. Cl.
    CPC .............. *B32B 5/028* (2013.01); *B32B 5/18* (2013.01); *B32B 7/12* (2013.01); *B32B 15/046* (2013.01); *B32B 15/14* (2013.01); *B32B 15/20*

(2013.01); *B32B 27/36* (2013.01); *B32B 37/12* (2013.01); *E04D 12/002* (2013.01); *B32B 2262/101* (2013.01); *B32B 2266/025* (2013.01); *B32B 2307/304* (2013.01); *B32B 2307/3065* (2013.01); *B32B 2307/31* (2013.01); *B32B 2307/7265* (2013.01); *B32B 2419/06* (2013.01)

(58) Field of Classification Search
    CPC ......... E04D 12/002; B32B 5/028; B32B 5/18; B32B 7/12; B32B 15/046; B32B 15/14; B32B 15/20; B32B 27/36; B32B 37/12; B32B 2262/101; B32B 2266/025; B32B 2307/304; B32B 2307/3065; B32B 2307/31; B32B 2307/7265; B32B 2419/06
    USPC ............................................. 442/1
    See application file for complete search history.

(56) References Cited

U.S. PATENT DOCUMENTS

| | | | | |
|---|---|---|---|---|
| 2002/0160673 A1* | 10/2002 | Zupon | ..................... | B32B 27/36 428/460 |
| 2005/0106965 A1* | 5/2005 | Wevers | ..................... | B32B 5/22 428/36.1 |
| 2011/0252723 A1* | 10/2011 | Devery | ............... | E04D 13/1618 52/302.1 |
| 2013/0177726 A1* | 7/2013 | Erasmus | ................ | G01N 19/04 73/827 |

* cited by examiner

*Primary Examiner* — Matthew D Matzek
(74) *Attorney, Agent, or Firm* — Hooker & Habib, P.C.

(57)    ABSTRACT

A laminated roofing underlayment is formed by bonding a synthetic roofing underlayment to one side of a layer of insulation, and bonding a reflective layer to an opposite side of the layer of insulation. The reflective layer has a reflective surface forming an outer surface of the roofing underlayment after the reflective layer is bonded to the thermal insulation.

31 Claims, 1 Drawing Sheet

ROOFING UNDERLAYMENT

RELATED APPLICATIONS

This application is a division of and claims priority to and the benefit of the filing date of currently pending U.S. patent application Ser. No. 15/316,624 titled "Roofing Underlayment" and filed Dec. 6, 2016, which in turn is a US nationalization of and claims priority to now expired International Patent Application PCT/US15/34442 titled "Roofing Underlayment" and filed Jun. 5, 2015, which in turn claims priority to of U.S. Provisional Patent Application No. 62/010,059 titled "Roofing Underlayment" and filed Jun. 10, 2014, each of the foregoing priority patent applications being incorporated by reference herein.

FIELD OF THE DISCLOSURE

The disclosure related to construction materials, and in particular to roofing underlayments placed between a roof deck and roofing material.

BACKGROUND OF THE DISCLOSURE

Roofing underlayment is placed between a roof deck and roofing material. Roofing underlayment protects the roof deck from water that penetrates the roofing material and helps in directing water from seams, joints, and other vulnerable deck areas.

Roofing underlayment is generally used with sloped roofs (but can be used with some flat roofs), and is used with many different types of roofing materials—including asphalt or wood shingles, clay, slate, or concrete tiles, shakes, metal roof coverings, and the like.

Conventional roofing underlayments include asphalt-saturated organic felt paper (also known as roofing felt) and synthetic roofing underlayments made from a variety of materials such as a mix or weave of polypropylene, polyester, and fiberglass fibers. Synthetic roofing underlayments are generally lighter and easier to install than roofing felt. Unlike paper, the synthetic fibers do not absorb water, and so many synthetic underlayments can be exposed to weather for up to six months to protect the roof deck from exposure while the roof is under construction or repair.

Although conventional roofing underlayments have been used successfully, there is still need for improvement. In particular it would be desirable that a roofing underlayment provide better thermal insulation performance while still being relatively light weight and easy to install.

SUMMARY OF THE DISCLOSURE

Disclosed is a roofing underlayment that provides better thermal insulation than conventional roofing underlayments, while still being relatively light weight and easy to install.

An embodiment of a roofing underlayment includes a laminated layer structure formed by a synthetic roofing underlayment on one side of the structure, a reflective surface on the other side of the structure, and insulation material between the synthetic underlayment and the reflective surface.

A possible embodiment of the laminated structure includes fiberglass as the insulation material, and aluminum foil forming the reflective surface. The aluminum foil layer may, in possible embodiments, include scrim that improves traction on the foil layer.

Another possible embodiment of the laminated structure includes polyethylene terephthalate forming the reflective surface.

Yet another possible embodiment of the laminated structure includes MYLAR® polyester film forming the reflective surface.

A still further possible embodiment of the laminated structure the insulation material is polyethylene foam.

An additional possible embodiment of the laminated structure the insulation material is bubble insulation in which one or more layers of air bubbles are formed and trapped within material. The bubble insulation may be made from polyethylene.

The disclosed roofing underlayment can be provided as rolls or sheets. In use, the underlayment is placed on the roof deck with either side against the roof deck. The roofing underlayment is attached to the roof deck with adhesives or fasteners in the conventional manner used for attaching conventional synthetic underlayments.

The reflective layer and the synthetic roofing underlayment layer both form waterproof membranes that protect the roof deck. The reflective layer when facing up reflects sunlight, thereby providing the roof deck additional protection from exposure while the roof is under construction or repair. The insulation layer and the reflective layer resist heat transfer between the roof deck and the roofing material.

Embodiments of the disclosed roofing underlayment can also help a roof assembly in meeting the burning brand test of the current Underwriters Laboratory, LLC. (UL) 790 standard or the current ASTM International E108 standard for Class A classification of roof assemblies for external fire performance. UL is located at 333 Pfingsten Road, Northbrook, IL 60062 United States of America. ASTM International is located at 100 Barr Harbor Drive, West Conshohocken, PA, 19428, United States of America.

Other objects and features of the disclosure will become apparent as the description proceeds, especially when taken in conjunction with the accompanying one or more drawing sheets illustrating one or more illustrative, non-limiting embodiments.

DETAILED DESCRIPTION

Figures 1, 2:
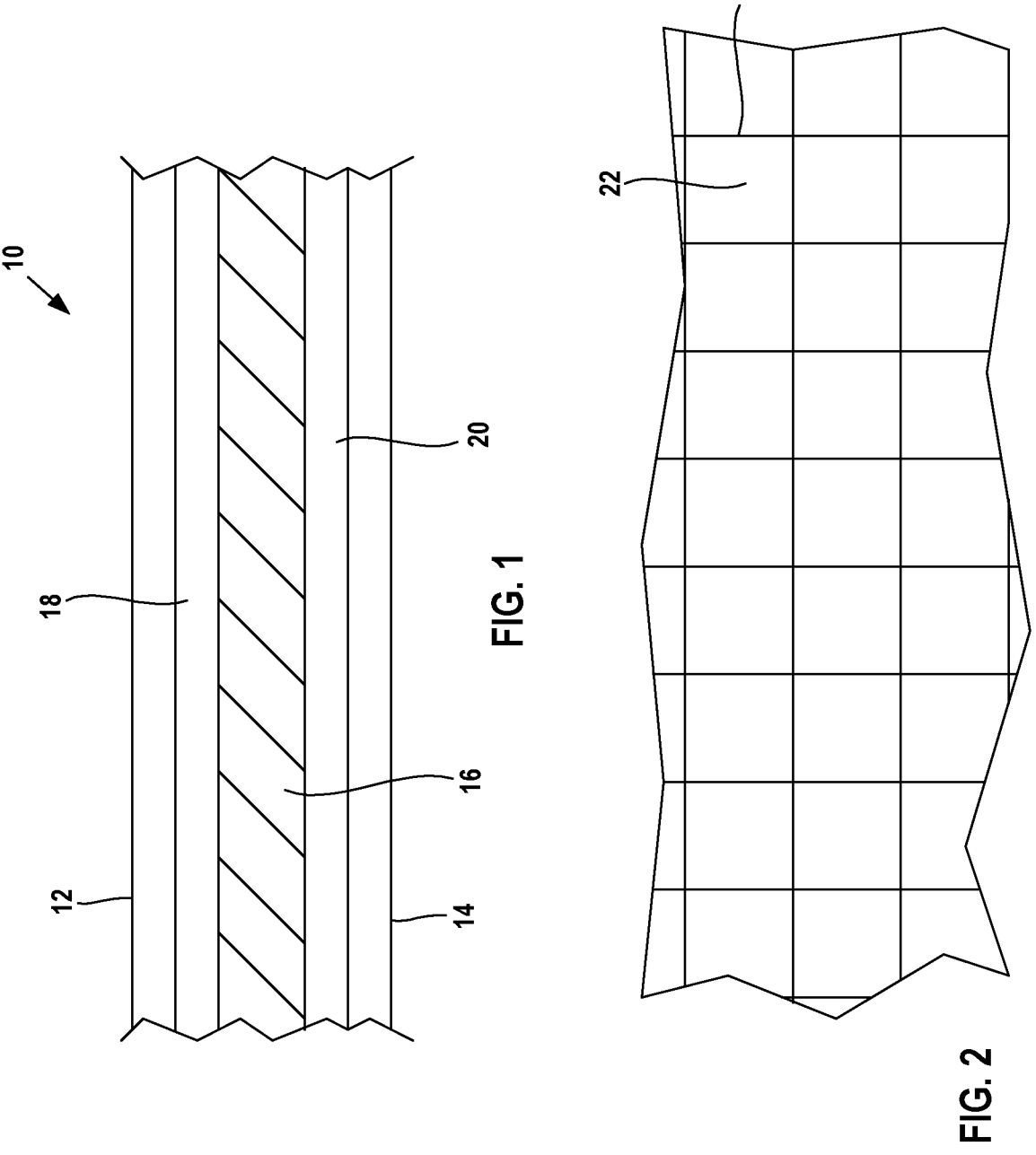
FIG. 1 is a sectional view through the thickness of a first embodiment roofing underlayment.
FIG. 2 is a sectional view through the thickness of the reflective layer of a second embodiment roofing underlayment.

FIG. 1 illustrates a first embodiment roofing underlayment 10. FIG. 1 illustrates the underlayment 10 being formed from a conventional synthetic roofing underlayment 12 on one side of the underlayment 10, a reflective layer 14 on the other side of the underlayment 10, and an insulation layer 16 between the opposite layers 12, 14.

The synthetic roofing underlayment 12 in possible non-limiting embodiments can be the commercially available synthetic roofing underlayment sold by Atlas Roofing Corporation, Atlanta, Georgia, under the SUMMIT trademark or the synthetic roofing underlayment sold by E. I. du Pont de Nemours and Company, Wilmington, Delaware, under the ROOFLINER trademark, or similar synthetic roofing underlayments available from others.

The reflective layer 14 may be made of aluminum film or foil and includes a reflective surface forming an outer surface on the other side of the underlayment 10.

The insulation layer 16 may be formed of fiberglass, polyethylene foam, an organic insulation material, or other suitable, preferably fireproof, insulating material. The illustrated insulation layer 16 is a fiberglass insulation layer nominally ⅜ (three-eighths) inch thick. Other embodiments of the roofing underlayment can use a different insulation thickness to achieve, for example, a different R-value.

An adhesive layer 18 adheres and bonds the reflective layer 14 to the insulation layer 16. The illustrated adhesion layer 18 is formed as an activated heat seal film 18 (the thickness of the heat seal film 18 shown in the figure is exaggerated for clarity). In the illustrated embodiment the heat seal film is activated by flame lamination in a conventional manner. The heat seal film is preapplied as a backing to one side of the aluminum film. An integral heat seal film/aluminum film material is commercially available from the Johns-Manville Corporation, of Denver, Colorado USA.

The heat seal film adhering to the aluminum film substrate is then activated when manufacturing the reflective insulation 10 to adhere the aluminum film to the insulation.

In other possible embodiments the adhesive layer 18 is formed from hot melt glue or other suitable adhesive or glue.

An adhesive layer 20 is shown separate from and between the synthetic underlayment layer 12 and the insulation layer 16 (the thickness of the adhesive layer 20 shown in the figure is exaggerated for clarity). The adhesive layer 20 adheres and bonds the underlayment layer 12 and the insulation layer 16. The adhesive layer 20 can be formed from hot melt glue, an activated heat seal film, or any other suitable adhesive or glue.

In use, the roofing underlayment 10 is attached to the roof deck preferably with the synthetic roofing underlayment layer 12 against the roof deck and the reflective layer 14 facing away from the roof deck. In addition to reflecting sunlight and UV rays, the reflective layer 14 assists the synthetic roofing underlayment layer 12 in forming an additional waterproof membrane protecting the roof deck.

The roofing material is then installed to the roof deck over the roofing underlayment 10 in a conventional manner.

The roofing underlayment 10 can also be attached to the roof deck with the reflective layer 14 against the roof deck and the synthetic roofing underlayment layer 12 facing away from the roof deck if desired.

FIG. 2 illustrates the reflective layer of a second embodiment roofing underlayment that includes an aluminum foil 22 and a scrim 24 formed as a rectangular grid attached to the inner side of the foil 22. The scrim 24 is conventional and so will not be described in detail. The scrim 24 in possible embodiments of the roofing underlayment makes the reflective layer stronger. In yet other possible embodiments of the roofing underlayment, the scrim 24 can be sized to cause the outer surface of the reflective layer to be uneven Or non-smooth, thereby increasing footing traction for workers walking on the reflective layer when the roofing underlayment is attached to a sloping roof deck.

Roofing underlayment and method for forming roofing underlayment may include the following features, alone or in any combination:

1. A roofing underlayment having opposite sides, the roofing underlayment comprising:
   a synthetic roofing underlayment on one side;
   a reflective layer on the other side, the reflective layer comprising a reflective outer surface on the other side of the roofing underlayment; and an insulation layer between the synthetic roofing underlayment and the reflective layer, the insulation layer comprising insulation.

2. The roofing underlayment of feature 1 wherein the reflective layer comprises at least one of: aluminum foil, aluminum film, MYLAR® polyester film, and polyethylene terephthalate.

3. The roofing underlayment of feature 1 wherein the reflective layer forms a non-smooth outer surface of the roofing underlayment.

4. The roofing underlayment of feature 1 wherein the reflective layer comprises scrim.

5. The roofing underlayment of feature 1 wherein the insulation comprises at least one of: fiberglass insulation, polyethylene foam insulation, bubble insulation, and an organic insulation.

6. The roofing underlayment of feature 1 wherein the insulation is fireproof.

7. The roofing underlayment of feature 1 comprising a first adhesive layer bonding together the reflective layer and the insulation layer.

8. The roofing underlayment of feature 7 wherein the first adhesive layer is an activated heat seal film.

9. The roofing underlayment of feature 7 wherein the first adhesive layer is formed from hot melt glue.

10. The roofing underlayment of feature 1 comprising a second adhesive layer bonding the synthetic roofing underlayment and the insulation layer.

11. The roofing underlayment of feature 1 wherein the roofing underlayment forms part of a roof assembly that comprises a roof deck and roofing material, the roofing underlayment on the roof deck, the roofing material overlaying the roofing underlayment.

12. The roofing underlayment of feature 11 wherein the roofing assembly meets the class A requirements of either the Underwriters Laboratory 790 standard or the ASTM International E108 standard in effect on the filing date of this application.

13. The roofing underlayment of feature 1 wherein the insulation layer comprises fiberglass insulation having a nominal thickness of about three-eighths of an inch.

14. A method for forming a roofing underlayment comprising the steps of: bonding a synthetic roofing underlayment to one side of a layer of insulation; and bonding a reflective layer to an opposite side of the layer of insulation, the reflective layer having a reflective surface forming an outer surface of the roofing underlayment after the reflective layer is bonded to the thermal insulation.

15. The method of feature 14 wherein the step of bonding the reflective layer comprises activating a heat seal film.

16. The method of feature 15 wherein the heat seal film is attached to the reflective layer prior to activation.

17. The method of feature 14 wherein the reflective layer comprises at least one of: aluminum foil, aluminum film, MYLAR® polyester film, and polyethylene terephthalate.

18. The method of feature 14 wherein the reflective layer comprises an uneven outer surface of the roofing underlayment after the reflective layer is bonded to the thermal insulation.

19. The method of feature 14 wherein the insulation comprises at least one of: fiberglass insulation, polyethylene foam insulation, bubble insulation, and an organic insulation.

While one or more embodiments have been described in detail, it is understood that this is capable of modification and that the disclosure is not limited to the precise details set forth but includes such changes and alterations as fall within the purview of the following claims.

What is claimed is:

1. A method for forming a roofing underlayment that when placed between a roof deck and roofing material protects the roof deck from water that penetrates the roofing material, the method comprising the steps of:

(a) bonding a synthetic roofing underlayment to one side of a layer of insulation, the synthetic roofing underlayment being waterproof whereby when the roofing underlayment is placed between a roof deck and roofing material fastened to the roof deck, the synthetic roofing underlayment resists water that penetrates the roofing material from reaching the roof deck while the roofing material is fastened to the roof deck;

(b) bonding a reflective layer to an opposite side of the layer of insulation, the reflective layer having a reflective surface forming an outer surface of the roofing underlayment after the reflective layer is bonded to the thermal insulation;

(c) after performing steps (a) and (b), forming the roofing underlayment into a roll; and (d) placing the roofing underlayment between a roof deck and roofing material.

2. The method of claim 1 wherein the step of bonding the reflective layer comprises activating a heat seal film.

3. The method of claim 2 wherein the heat seal film is attached to the reflective layer prior to activation.

4. The method of claim 1 wherein the reflective layer comprises at least one of: aluminum foil, aluminum film, polyester film, and polyethylene terephthalate.

5. The method of claim 1 wherein the reflective layer comprises an uneven outer surface of the roofing underlayment after the reflective layer is bonded to the thermal insulation.

6. The method of claim 1 wherein the insulation comprises at least one of: fiberglass insulation, polyethylene foam insulation, bubble insulation, and an organic insulation.

7. The method of claim 1 wherein the synthetic roofing underlayment comprises a weave of synthetic fibers.

8. The method of claim 7 wherein the weave of synthetic fibers compromise polypropylene fibers.

9. The method of claim 7 wherein the weave of synthetic fibers comprises polyester fibers.

10. The method of claim 7 wherein the weave of synthetic fibers comprises fiberglass fibers.

11. A method for protecting a roof deck from water penetrating a roofing material placed over and fastened to the roof deck, the method comprising the step of:

placing a roofing underlayment between the roof deck and the roofing material, the roofing underlayment comprising:

(a) a first layer of insulation, the first layer of insulation having opposite first and second outer sides;

(b) a synthetic roofing underlayment bonded to the first side of the layer of insulation, the synthetic roofing underlayment being waterproof whereby when the roofing underlayment is placed between the roof deck and the roofing material fastened to the roof deck, the synthetic roofing underlayment resists water that penetrates the roofing material from reaching the roof material is deck while the roofing fastened to the roof deck; and (c) a reflective layer bonded to the second side of the layer of insulation, the reflective layer having a reflective surface forming an outer surface of the roofing underlayment after the reflective layer.

12. The method of claim 11 comprising the steps of:

placing the roofing material onto the roof deck whereby the roofing underlayment covers the roof deck; and placing the roofing material over the roofing underlayment covering the roof deck and then fastening the roofing material to the roof deck.

13. The method of claim 12 comprising the steps of:

providing the roofing underlayment as a roll of roofing underlayment; and unrolling the roll of roofing underlayment onto the roof deck whereby the unrolled roofing underlayment covers the roof deck.

14. The method of claim 12 comprising the steps of:

placing the roofing underlayment onto the roof deck whereby the roofing underlayment covers the roof deck; and placing the roofing material over the roofing underlayment covering the roof deck and then fastening the roofing material to the roof deck.

15. The method of claim 11 wherein the step of placing the roofing underlayment between the roof deck and the roofing material comprises the step of placing the synthetic roofing underlayment of the roofing underlayment against the roof deck.

16. The method of claim 11 wherein the roofing underlayment comprises a first activated heat seal film bonding the synthetic roofing underlayment to the insulation layer and a second activated heat seal film bonding the reflective layer to the insulation layer.

17. The method of claim 11 wherein the synthetic roofing underlayment of the roofing underlayment comprises a weave of synthetic fibers.

18. The method of claim 11 wherein the reflective layer of the roofing underlayment comprises at least one of: aluminum foil, aluminum film, polyester film, and polyethylene terephthalate.

19. The method of claim 11 wherein the reflective layer of the roofing underlayment forms an uneven outer surface of the roofing underlayment.

20. The method of claim 11 wherein the insulation of the roofing underlayment comprises at least one of: fiberglass insulation, polyethylene foam insulation, bubble insulation, and an organic insulation.

21. The method of claim 11 wherein the roofing material is at least one of the following (a), (b), (c), and (d): (a) asphalt or wood shingles, (b) clay, slate, or concrete tiles, (c) shakes, and (d) metal roof coverings.

22. A roof assembly comprising:

a roof deck;

a roofing material placed over and fastened to the roof deck; and a roofing underlayment being disposed between the roof deck and the roofing material, the roofing underlayment comprising:

(a) a first layer of insulation, the first layer of insulation having opposite first and second outer sides;

(b) a synthetic roofing underlayment bonded to the first side of the layer of insulation, the synthetic roofing underlayment being waterproof whereby when the roofing underlayment is placed between the roof deck and the roofing material fastened to the deck, the synthetic roofing underlayment resists water that penetrates the roofing material from reaching the roof deck while the roofing material is fastened to the roof deck; and (c) a reflective layer bonded to the second side of the layer of insulation, the reflective layer having a reflective surface forming an outer surface of the roofing underlayment after the reflective layer.

23. The roof assembly of claim 22 wherein the synthetic roofing underlayment is against the roof deck.

24. The roof assembly of claim 22 wherein the roofing underlayment comprises a first activated heat seal film bonding the synthetic roofing underlayment to the insulation layer and a second activated heat seal film bonding the reflective layer to the insulation layer.

25. The roof assembly of claim 22 wherein the synthetic roofing underlayment comprises a weave of synthetic fibers.

26. The roof assembly of claim 22 wherein the reflective layer of the roofing underlayment comprises at least one of: aluminum foil, aluminum film, polyester film, and polyethylene terephthalate.

27. The roof assembly of claim 22 wherein the reflective layer of the roofing underlayment forms an uneven outer surface of the roofing underlayment.

28. The roof assembly of claim 27 wherein the uneven outer surface of the roofing underlayment comprises scrim.

29. The roof assembly of claim 22 wherein the insulation of the roofing underlayment is fireproof.

30. The roof assembly of claim 22 wherein the insulation of the roofing underlayment comprises at least one of: fiberglass insulation, polyethylene foam insulation, bubble insulation, and an organic insulation.

31. The roof assembly of claim 22 wherein the roofing material is at least one of the following (a), (b), (c), and (d): (a) asphalt or wood shingles, (b) clay, slate, or concrete tiles, (c) shakes, and (d) metal roof coverings.

* * * * *